United States Patent [19]

Aikawa et al.

[11] Patent Number: 5,291,312
[45] Date of Patent: Mar. 1, 1994

[54] TRANSMISSIVE ILLUMINATION TYPE IMAGE INPUT APPARATUS

[75] Inventors: Toshiya Aikawa, Kawasaki; Eisaku Maeda, Sakura; Satoru Yoshizawa, Chofu, all of Japan

[73] Assignee: Nikon Corporation, Tokyo, Japan

[21] Appl. No.: 749,551

[22] Filed: Aug. 23, 1991

[30] Foreign Application Priority Data

Aug. 29, 1990 [JP] Japan .................................. 2-227082

[51] Int. Cl.⁵ .............................................. H04N 1/00
[52] U.S. Cl. .................................... 358/474; 358/483; 358/471
[58] Field of Search ................ 358/76, 486, 487, 494, 358/474, 302; 355/67, 72, 75

[56] References Cited

U.S. PATENT DOCUMENTS

| | | | |
|---|---|---|---|
| 4,660,091 | 4/1987 | Nutting | 358/214 |
| 4,751,582 | 6/1988 | Koseki et al. | 358/471 |
| 4,814,798 | 3/1989 | Fukae et al. | 358/483 |
| 4,996,604 | 2/1991 | Ogawa et al. | 358/474 |
| 5,113,268 | 5/1992 | Yoshida et al. | 358/474 |

FOREIGN PATENT DOCUMENTS

| | | |
|---|---|---|
| 389965 | 2/1990 | Austria . |
| 0149196 | 7/1985 | European Pat. Off. . |
| 2336366 | 10/1975 | Fed. Rep. of Germany . |

*Primary Examiner*—Stephen Brinich
*Attorney, Agent, or Firm*—Shapiro and Shapiro

[57] ABSTRACT

An image input apparatus comprises a stage provided on a substantially horizontal surface of a main body of the apparatus and detachably supporting a film original; a stage scanning mechanism for horizontally moving the stage; an illumination unit provided above the stage and containing a light source for illuminating the film original; and a photoelectric converter for effecting photoelectric conversion of the light transmitted by the film original, wherein the illumination unit can assume a position close to the stage and surrounding the upper and lateral spaces of the stage or a position separated from the stage.

4 Claims, 12 Drawing Sheets

TRANSMISSIVE ILLUMINATION TYPE IMAGE INPUT APPARATUS

BACKGROUND OF THE INVENTION

1. Field of the Invention

The present invention relates to an image input apparatus for reading an image for example on a photographic film by transmissive illumination and converting said image into electrical signals.

2. Related Background Art

A conventional image input apparatus of the above-explained kind is configured as shown in FIGS. 14 and 15 and as will be explained in the following.

The apparatus is divided into a front part 201 and a rear part 202, with a recessed part 203 in the middle.

Said recessed part 203 is provided to accommodate a film holder 205, which is mounted on a stage 204 fixed to the front part 201.

The rear part 202 houses therein a lamp for illuminating a film set in the film holder 205, an illuminating lens, various circuits and a power supply unit.

Also the front part 201 houses therein a mechanism for moving the stage 204, a projection lens and a line sensor.

The light from the lamp in said rear part 202 is transmitted by the illuminating lens 206 and illuminates the film set in the film holder 205. The light transmitted by said film enters the projection lens in the front part 201, and is focused on the line sensor. A horizontal movement of the stage 204 causes the film to move likewise, and the entire image on the film is scanned in succession and focused on the line sensor.

In this operation, in order to exclude the external light, a cover 207 is moved in a sliding movement to cover the recessed part 203 as shown in FIG. 15.

The image focused on the line sensor is converted into electrical signals which are subjected to amplification and correction.

The above-explained prior art has been associated with following drawbacks.

The apparatus is difficult to make compact and involves limitation in the design, as the recessed part 203 required for mounting the film holder 205 occupies a considerable space.

Also the mounting of the film holder 205 onto the stage 204 is difficult since it is positioned vertically in the recessed part 203.

Furthermore, as the recessed part 203 needs to be covered by the cover 207 for avoiding the intrusion of external light, the number of component parts increases inevitably.

SUMMARY OF THE INVENTION

In consideration of the foregoing, an object of the present invention is to provide an image input apparatus which is free from the recessed part, and allows easy mounting of the film holder and secure light shielding.

The above-mentioned object can be attained, according to the present invention, by an image input apparatus provided with a stage provided on a substantially horizontal plane of the main body of the apparatus for detachably supporting an original film, a stage scanning mechanism for horizontally moving said stage, an illumination unit positioned above said stage for illuminating said original film, and photoelectric conversion means for effecting photoelectric conversion of the light transmitted by said original film, wherein said illumination unit can assume a position close to said stage and surrounding the upper and lateral spaces of said stage, or a position separated from said stage.

In the above-explained structure, the illumination unit is placed in the position separated from the stage at the mounting of the original film whereby said film can be easily mounted on the stage on the horizontal plane, and, after said film mounting, the illumination unit is moved to the position close to and surrounding the upper and lateral spaces of the stage.

Thus the present invention makes it possible to dispense with the recessed part which has heretofore been necessary to provide a space for mounting the original film. The invention thus eliminates the prior art limitation in designing and allows the apparatus to be made compact.

Also since the illumination unit has the light shielding function, the light shield cover can be dispensed with and the number of component parts can be reduced.

Furthermore, the film mounting operation is facilitated since the stage for film mounting is provided on a substantially horizontal plane.

DETAILED DESCRIPTION OF THE PREFERRED EMBODIMENTS

Figure 1:
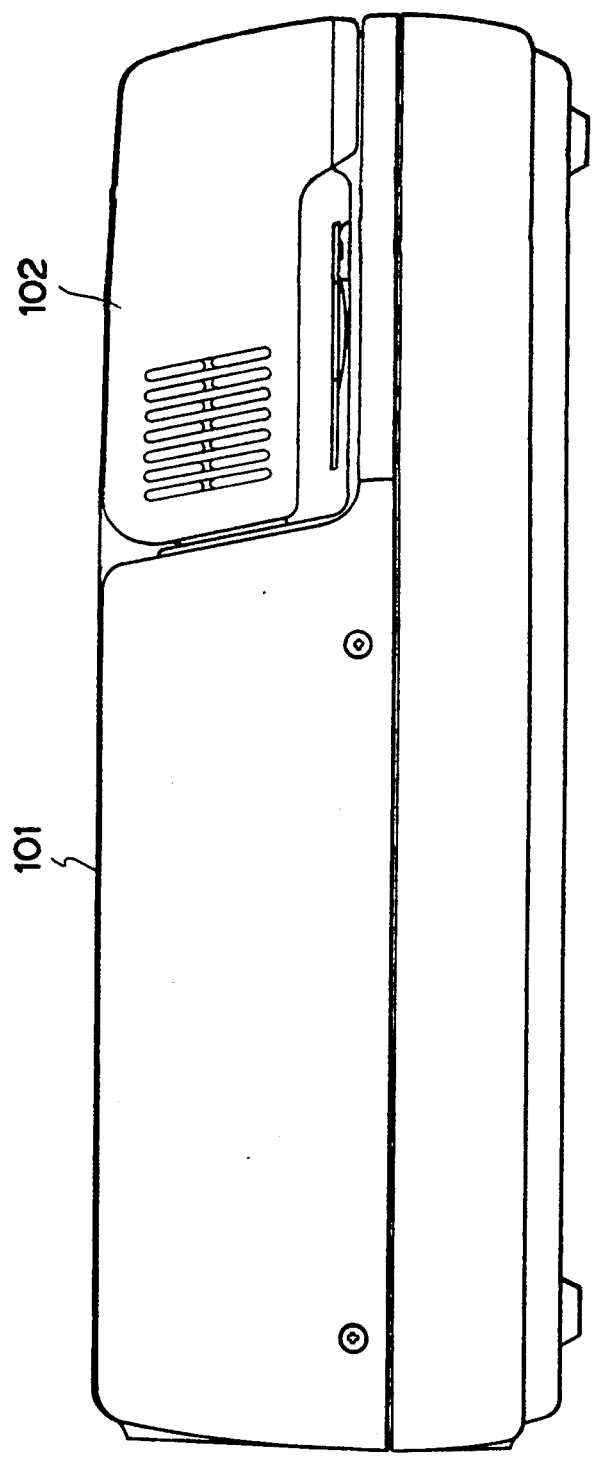
FIG. 1 is a lateral view of an image input apparatus embodying the present invention.
Figure 2:
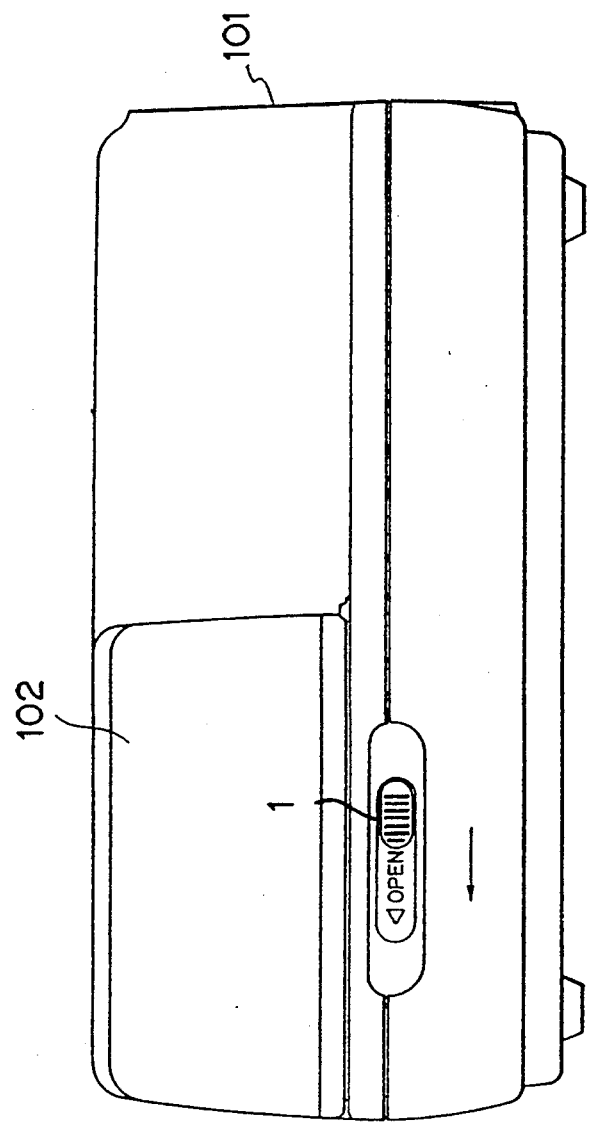
FIG. 2 is a front view of said image input apparatus.
Figure 3:
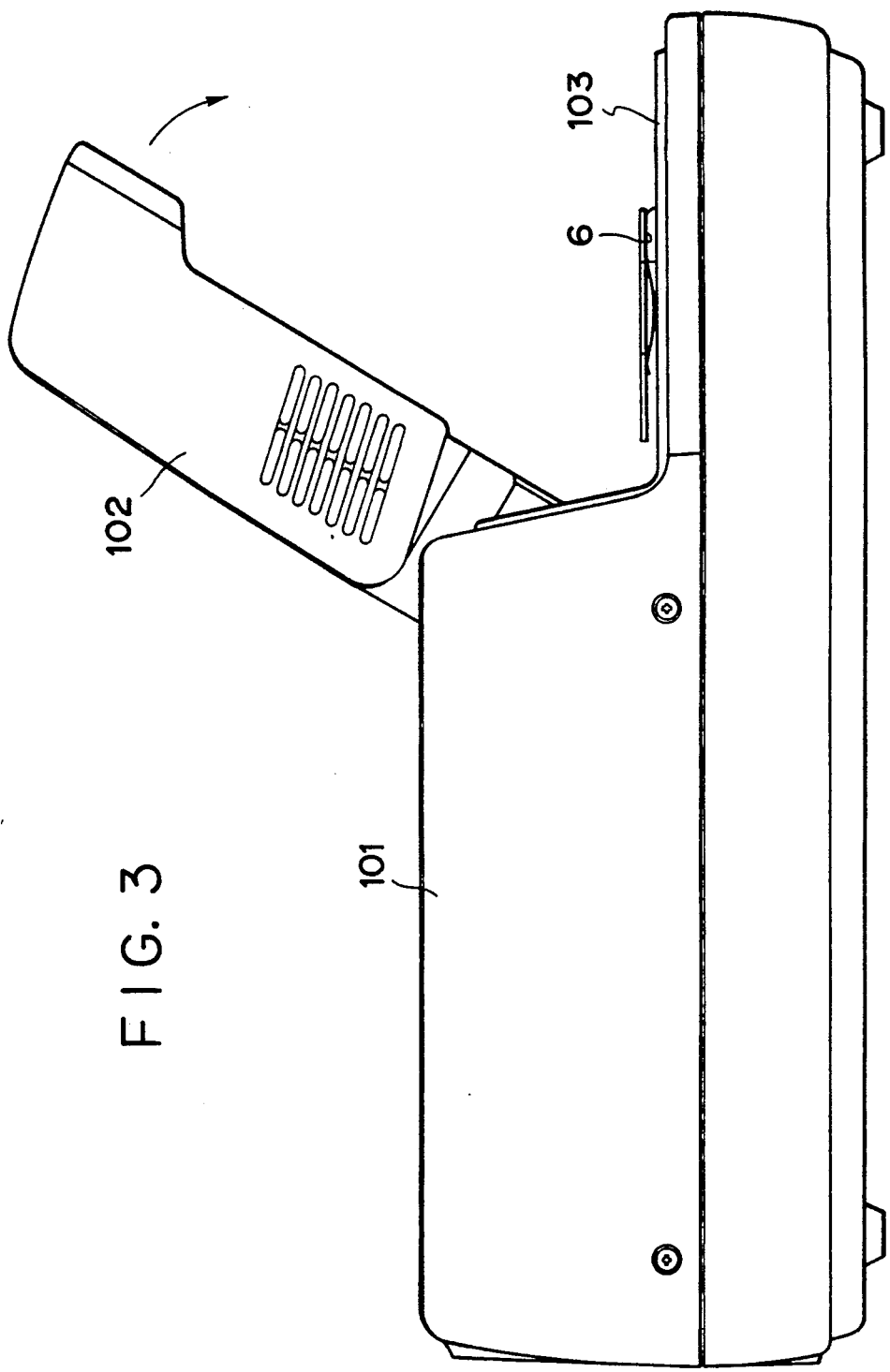
FIG. 3 is a lateral view of said image input apparatus with the illumination unit thereof in a lifted state.

FIGS. 1 to 3 illustrate an image input apparatus embodying the present invention, respectively in a lateral view, a front view and a lateral view with the illumination unit thereof in a lifted state.

Said apparatus is principally composed of a main body 101 and an illumination unit 102, which is popped up by sliding an illumination pop-up lever 1 in the lateral direction, and which stops at an angle as shown in FIG. 3. Such mechanism can be realized by already known technology.

A stage 6 for mounting a film holder 4 is provided on a horizontal surface 103, which is revealed when the illumination unit 102 is popped up.

The horizontal surface 103 need not be precisely horizontal, nor be precisely planar.

Figure 4:
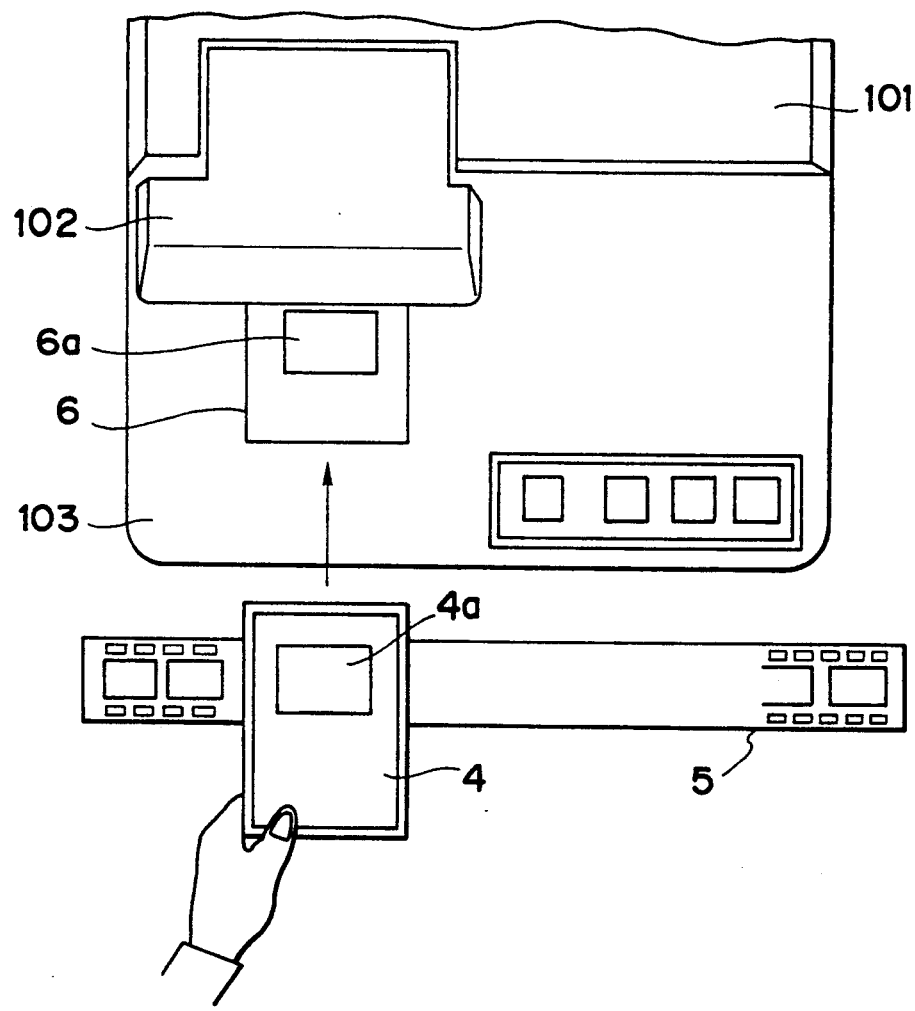
FIGS. 4 to 6 are views showing the mode of mounting of a film holder in said image input apparatus.
Figure 5:
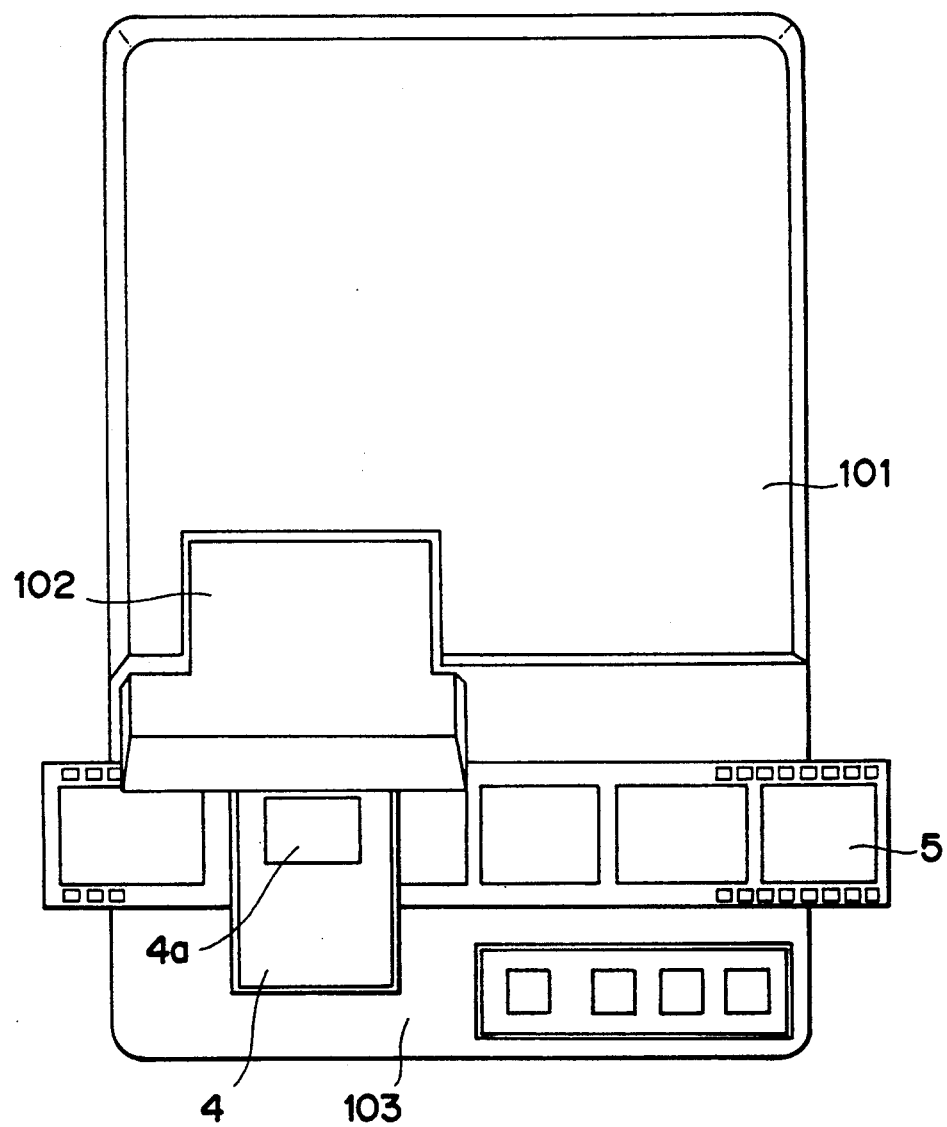
Figure 6:
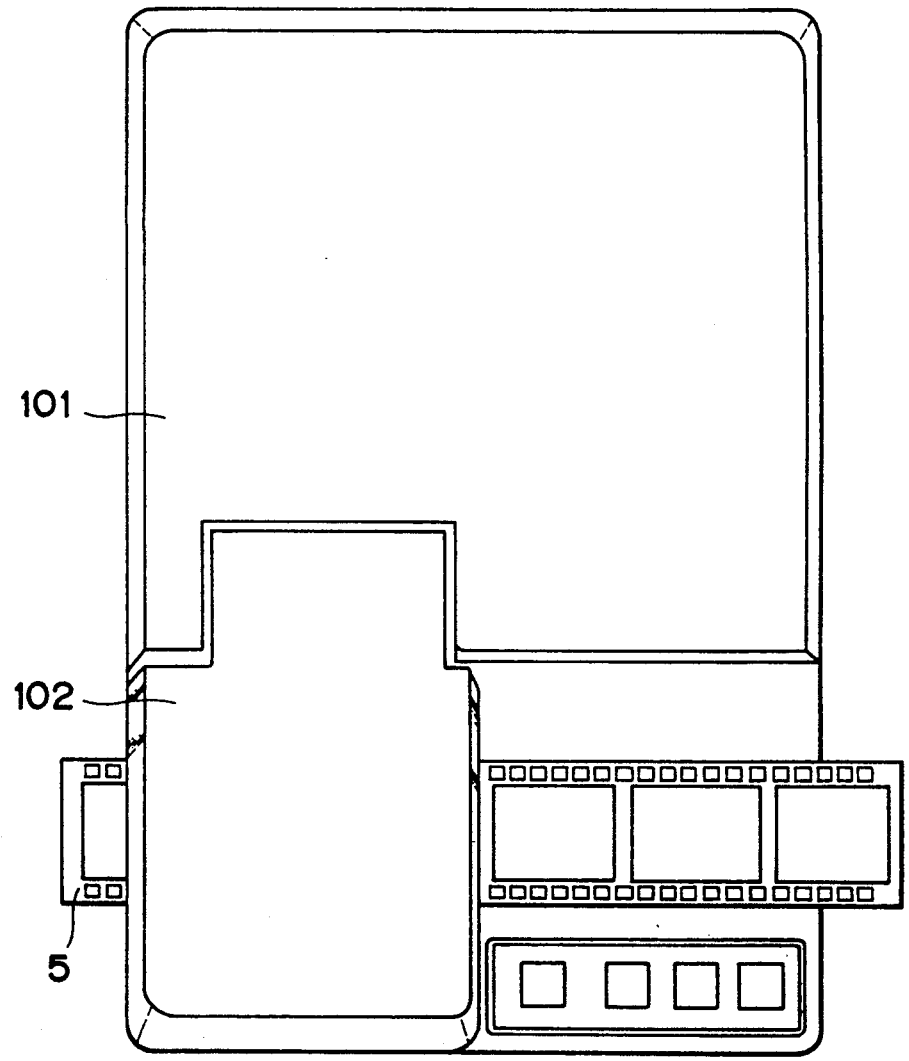

FIGS. 4 to 6 illustrate the mode of mounting of the film holder 4 on the stage 6.

The stage 6 is provided with a light-transmitting window 6a, and the film holder 4 is also provided with a window 4a.

The film holder 4 is so constructed as to sandwich a film original 5 therein, whereupon an image frame thereof is exposed in the window 4a.

The film holder 4 supporting the film original 5 is mounted on the stage 6 as shown in FIG. 5, in such a manner that the windows 4a and 6a mutually overlap. Then the illumination unit 102 is pressed down to a closed state shown in FIG. 6.

When the illumination unit 102 is closed, the film holder is enclosed by the horizontal surface 103 and the illumination unit 102, whereby the film original 5 supported in the film holder 4 and exposed in the window 4a thereof is shielded from the external light.

In the image input operation is initiated without closing the illumination unit 102, the amount of light becomes deficient since the illumination unit 102 is separated from the film original 5 so that the light from said unit 102 does not reach the film original. Such state may be identified from the output of a CCD line sensor 10 (to be discussed later), and there may be provided an alarm for an error state.

Also the mounting operation of the film holder 4 onto the stage 6 is facilitated since said stage 6 is provided on the horizontal surface 103.

In case the film original 5 is long, the end portions thereof appear from the sides of the illumination unit 102 as shown in FIG. 6, but this fact does not affect the function or performance of the apparatus. Consequently, even a long film original need not be cut or wound at the mounting.

Figure 7:
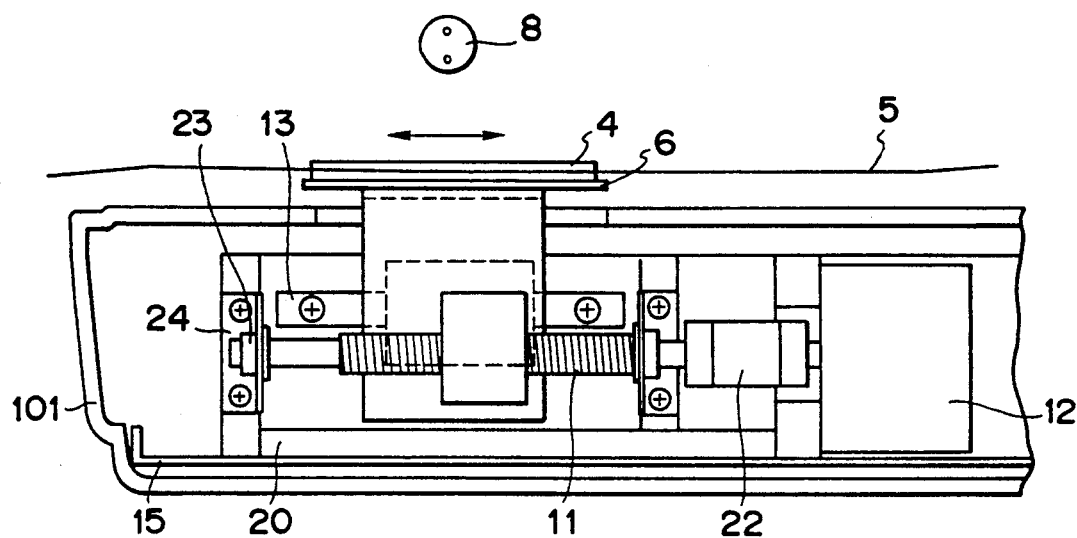
FIG. 7 is a schematic cross-sectional view, seen from the front direction, showing the structure of a stage driving unit of said image input apparatus.

FIG. 7 is a schematic cross-sectional view, seen from the front direction, showing the structure of a stage driving unit provided under the stage 6 in the main body 101.

Referring to FIG. 7, a lead screw mechanism 11 is driven, through a motor joint 22, by a stepping motor 12 controlled by a control system (not shown), whereby the stage 6 moves in the lateral direction as indicated by a double arrow.

Said stage 6 driven by said lead screw mechanism 11 moves on a linear guide mechanism 13, which precludes any movement other than that in the lateral direction in FIG. 7, such as might result from insufficient precision of manufacture of the lead screw mechanism 11.

Figure 8:
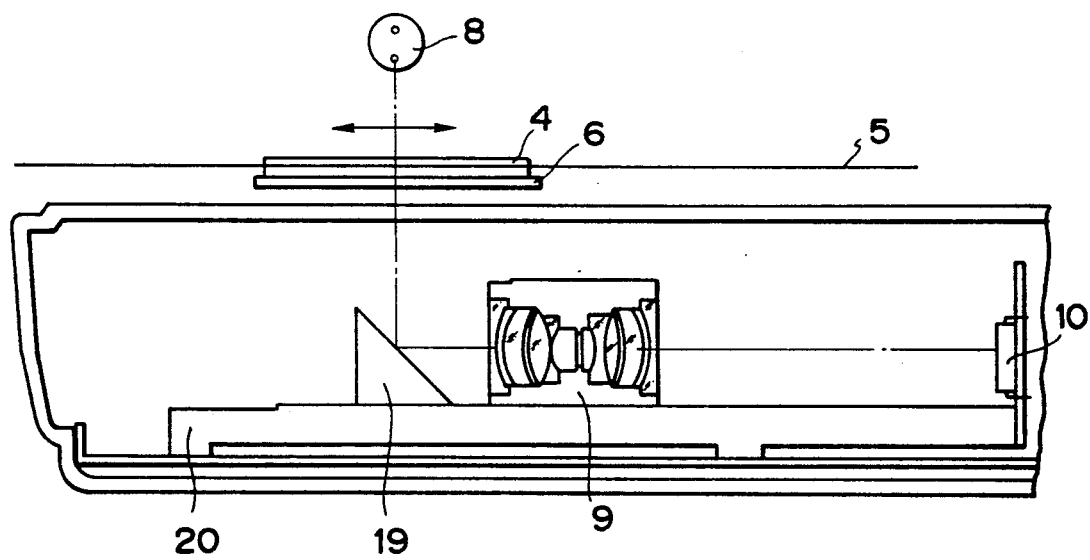
FIG. 8 is a schematic cross-sectional view, seen from the front direction, showing the structure of an optical system in said image input apparatus.

FIG. 8 is a schematic cross-sectional view, seen from the front direction, showing a structure for focusing the image of the film original 5 onto the CCD line sensor 10, by means of transmissive illumination.

Figure 9:
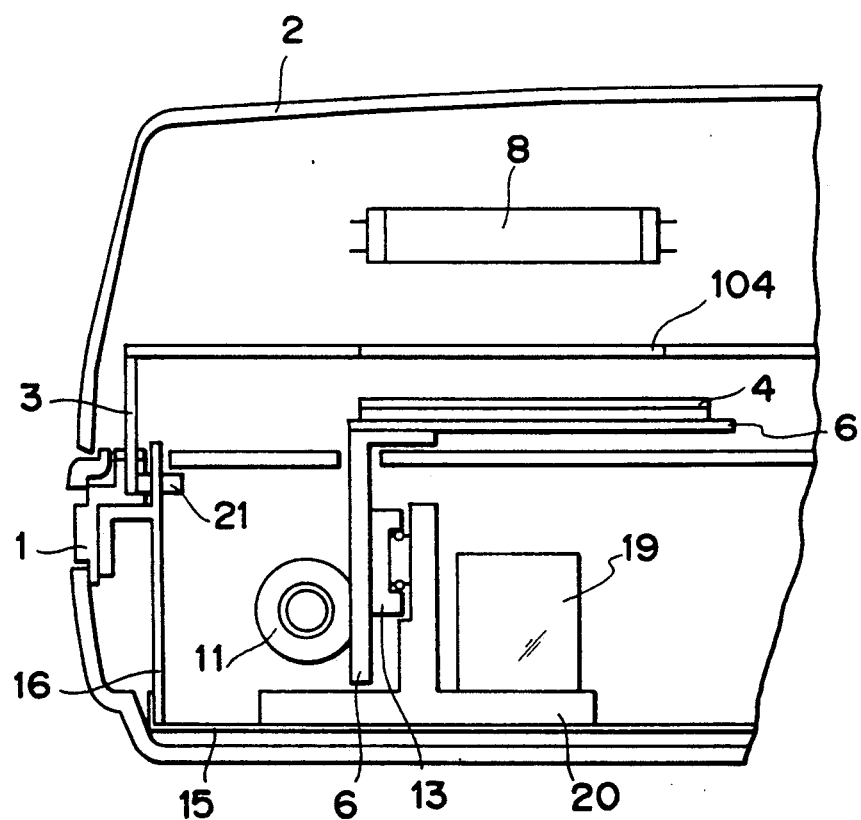
FIG. 9 is a schematic cross-sectional view, seen from the lateral direction, showing the structures shown in FIGS. 7 and 8.

FIG. 9 is a cross-sectional view, seen from the lateral direction, showing the structures shown in FIGS. 7 and 8.

As shown in FIG. 9, the mechanism shown in FIG. 7 and the optical system shown in FIG. 8 are both positioned on a scanning block 20 provided on a frame 15.

Referring to FIGS. 8 and 9, a lamp unit 8 provided in the illumination unit 102 is composed of a linear cylindrical light source, and, in the lower face of the illumination unit 102 there is provided a slit 104 for transmitting the light from said lamp unit 8. The light transmitted by said slit 104 illuminates a part of the film original 5 exposed in the window 4a of the film holder 4 mounted on the stage 6. The light transmitted by said film original 5 enters the main body 101 through the window 6a of the stage 6, is then reflected by a 45° mirror 19, and then focused on the CCD line sensor 10 by a projection optical system 9.

In the above-explained configuration, the mechanism shown in FIG. 7 moves the stage 6 during the illumination by the lamp unit 8, whereby a frame of film original 5, exposed in the window 4a of the film holder 4, succession is scanned in succession, and each line of the image is focused in succession on the CCD line sensor 10 to eventually enter the entire image.

The stage 6 is moved for example in the following manner. At the start of the image input operation, the stage 6 is moved to the right in such a manner that the left-hand end of the film image frame, exposed in the window 4a of the film holder 4, is positioned below the slit 104. The stage is then moved to the left after the start of the image input operation, and is stopped when the right-hand end of said image frame of the film original 5 passes under said slit 104.

The image lines focused on the CCD line sensor 10 are converted into electrical signals, which are then subjected to signal processing such as amplification and correction.

Figure 10:
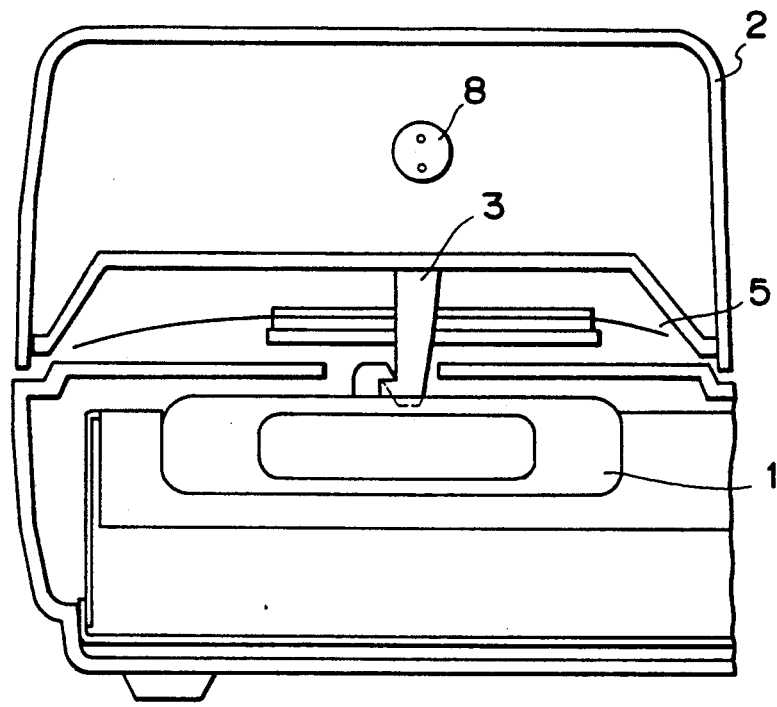
FIGS. 10 and 11 are schematic cross-sectional views of said image input apparatus with the illumination unit thereof in a closed state, seen from the front direction.
Figure 11:
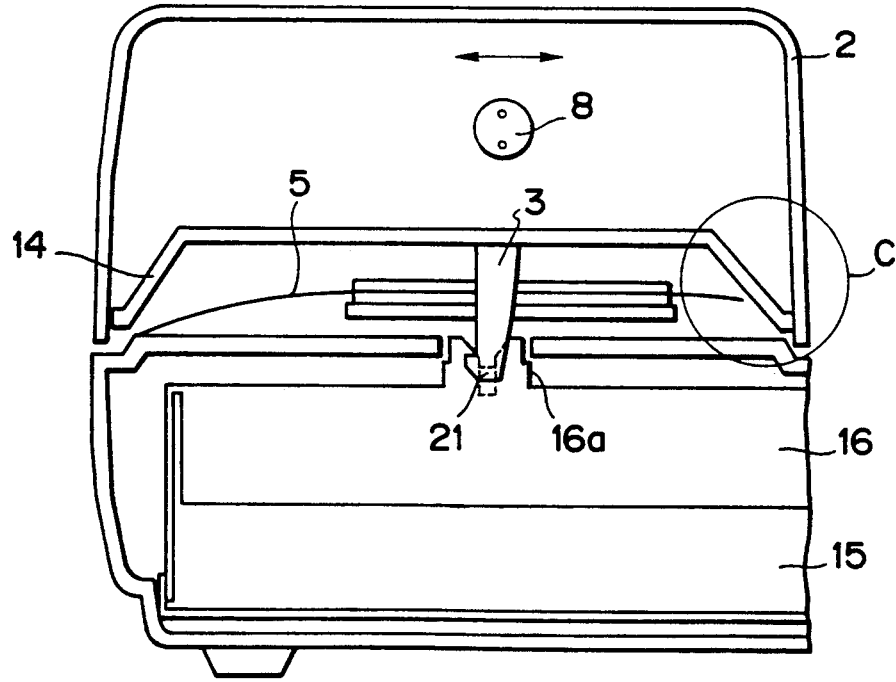

FIGS. 10 and 11 are schematic cross-sectional views, seen from the front direction, of a state with the illumination unit 102 in the closed state. The illumination unit pop-up lever 1 is shown in FIG. 10 but not in FIG. 11.

Referring to FIG. 10, said pop-up lever 1 is biased to the right by an unillustrated spring, thereby engaging with a lever key 3 and maintaining the illumination unit 102 in the closed state. By a sliding motion of said pop-up lever 1 to the left, the lever key 3 is liberated and the illumination unit 102 pops up.

When the illumination unit 102 is in the closed state, the force applied to the pop-up lever 1 is also applied to the lever key 3, whereby the position of illumination unit 102 tends to vary with respect to the stage 6, and the amount of light received by the CCD line sensor 10 fluctuates due to the unstable positioning of the lamp unit 8. Such phenomenon also occurs as a result of play in the connection between the illumination unit 102 and the main body 101.

Figure 12:
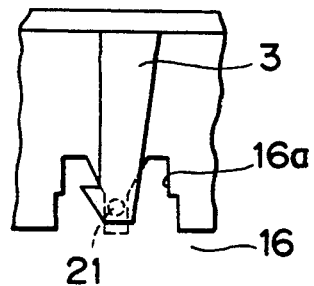
FIG. 12 is a partial magnified view of Fig. 11.

Therefore, in order to stabilize the position of the lamp unit 8, the lever key 3 is provided with a guide pin 21 and the frame 16 of the main body 101 is provided with a guide 16a, as shown in FIG. 11. FIG. 12 is a partial view in the vicinity of the lever key 3 shown in FIG. 11. With such structure, the guide pin 21 of the lever key 3 is guided by the guide 16a when the illumination unit 102 is closed. When the pop-up lever 1 engages with the lever key 3, it receives a force to the right, but the position of the illumination unit 102 in the lateral direction is stabilized since the movement in said lateral direction is limited by said guide 16a and guide pin 21.

Figure 13:
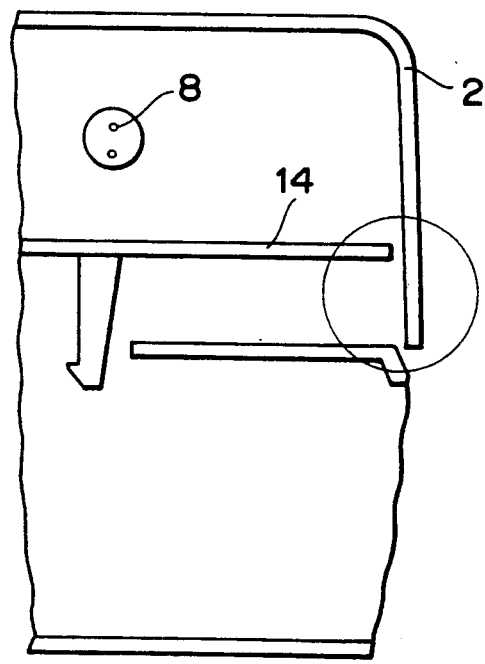
FIG. 13 is a comparative view showing the function of the illumination unit of said image input apparatus.
Figure 14:
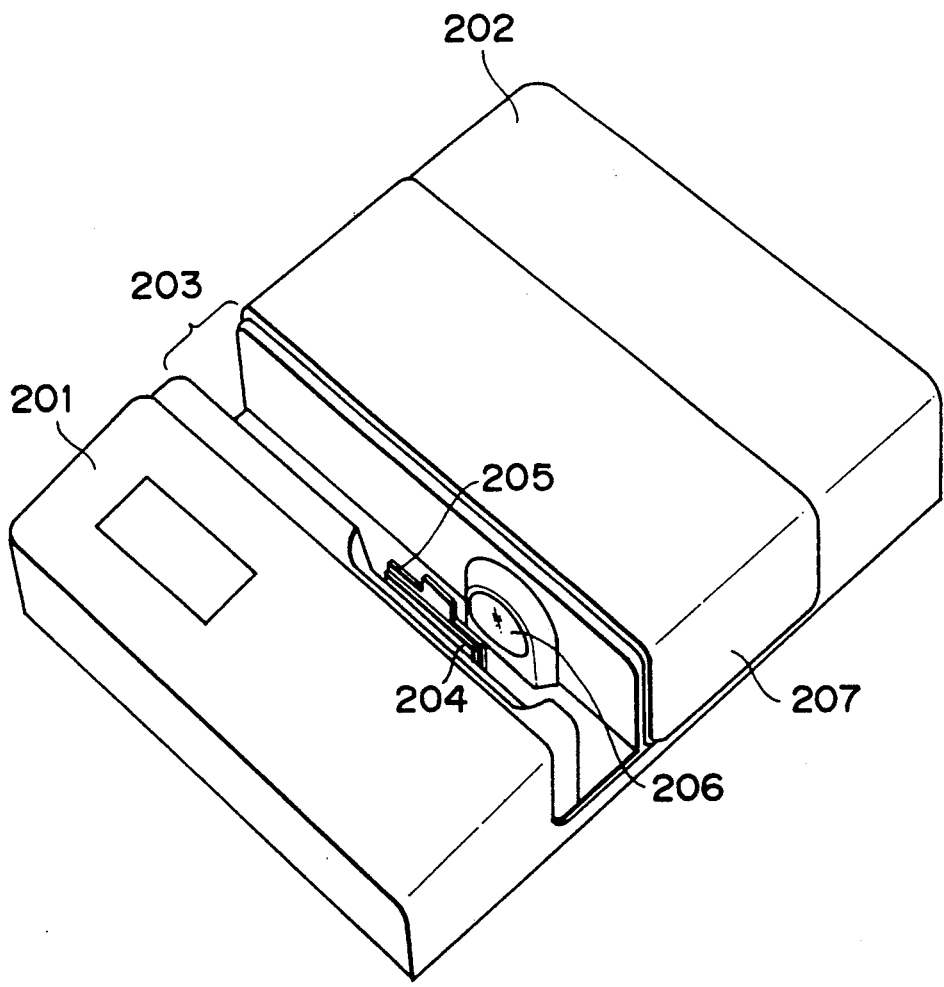
FIGS. 14 and 15 are external perspective views of a conventional image input apparatus.
Figure 15:
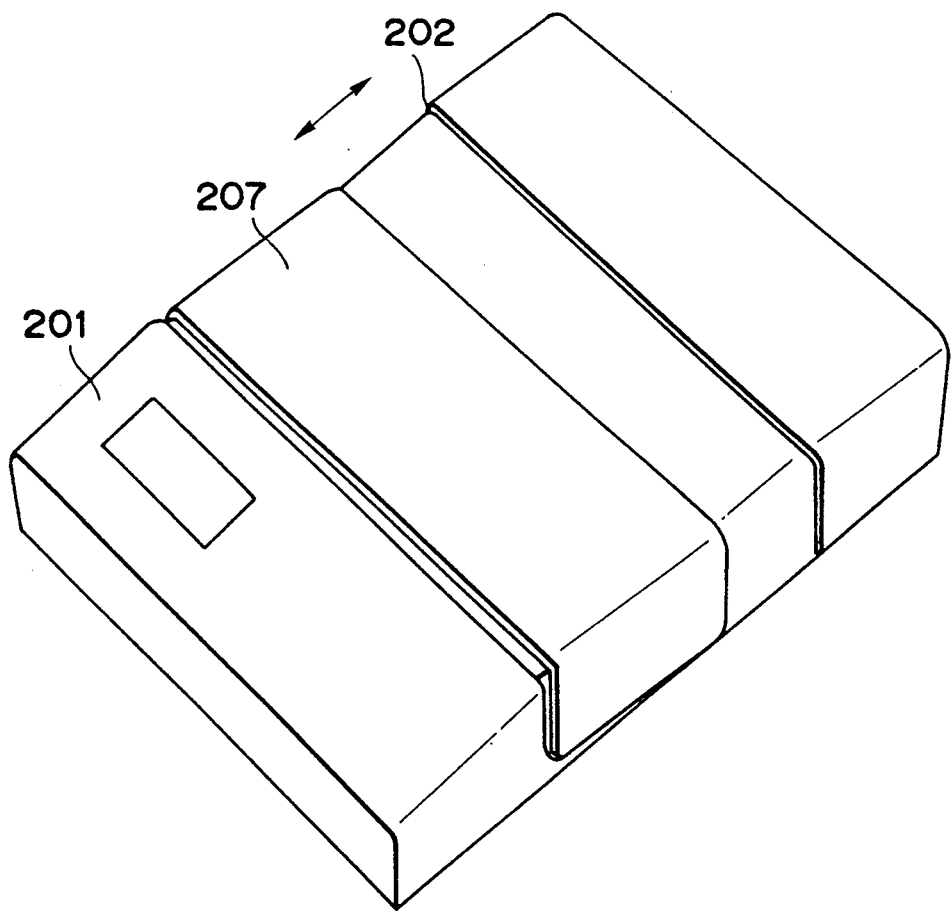

FIG. 13 is a view of a comparative structure of a circled part C in FIG. 11. The movement of the stage 6 causes lateral movement of the film original 5, and, with a movement to the right when the right-hand end of the film original 5 is positioned as shown in FIG. 11, said right-hand end of the film original may be caught by an illumination cover 2 in the structure shown in FIG. 13. Such an occurrence may damage the film original 5 or cause movement of the film original 5 in the film holder 4.

For this reason, the right- and left-hand ends of an illuminating frame 14 are bent downwards, and the film original 5 is therefore guided by the face of the thus bent frame and is no longer caught by the illumination cover 2.

What is claimed is:

1. An image input apparatus which reads a film original to input an image of the film original, comprising:
   a main body portion;
   a stage provided on a substantially horizontal surface of said main body portion and adapted to detachably support the film original;
   means for effecting horizontal scanning movement of said stage;
   an illumination unit including light source means for effecting transmissive illumination of the film original supported on said stage, and a light-shielding cover;
   a light sensor provided in said main body portion; and
   an optical system provided in said main body portion for directing to said light sensor light transmitted from said light source means through the film original supported on said stage;
   said illumination unit being displaceable between a first position close to said horizontal surface and in which said light source means effects the transmissive illumination of the film original in association with the scanning movement of said stage and also in which said light-shielding cover shields said stage from external light, and a second position raised from said horizontal surface to enable mounting of the film original on said stage.

2. An image input apparatus according to claim 1, further comprising alarm means for alarming when reading of the film original is attempted with said illumination unit not at said first position.

3. An image input apparatus according to claim 1, wherein said illumination unit has locating means for locating said illumination unit at a same predetermined position relative to said main body portion each time said illumination unit is brought to said first position.

4. An image input apparatus according to claim 1, wherein said stage is adapted to detachably support a film holder for mounting the film original.

* * * * *